United States Patent Office 3,632,699
Patented Jan. 4, 1972

1

3,632,699
WET-SPINNING OF POLYACRYLONITRILE
Donald L. Wilson and Graham J. Brealey, Coventry, England, assignors to Courtaulds Limited, London, England
No Drawing. Filed May 27, 1970, Ser. No. 41,046
Claims priority, application Great Britain, June 6, 1969, 28,654/69
Int. Cl. D01f 3/08
U.S. Cl. 264—38                           3 Claims

ABSTRACT OF THE DISCLOSURE

A process for spinning polyacrylonitrile filaments which comprises dosing a solution of polyacrylonitrile in sodium thiocyanate solution with a solution containing barium thiocyanate in an amount less than the stoichiometric equivalent of the ionic sulphate content of the polyacrylonitrile solution, thereby precipitating barium sulphate crystals, and extruding the dosed solution into an aqueous coagulant, forming filaments containing the barium sulphate crystals. The crystals of barium sulphate formed are of such small size that they easily pass through the holes of a spinnerette.

---

This invention is concerned with the spinning of polyacrylonitrile filaments by coagulating streams of a solution of polyacrylonitrile in a concentrated sodium thiocyanate solution, in an aqueous coagulant. "Polyacrylonitrile" for the purpose of this specification includes homopolymers of acrylonitrile and copolymers containing at least 85 percent of acrylonitrile, the balance being of one or more ethylenically unsaturated monomers copolymerisable with acrylonitrile, for example methyl acrylate, vinyl acetate, vinyl pyridine, styrene, vinyl sulphonic acid, itaconic acid.

The sodium thiocyanate is recycled in such a process. The dilute solution formed as a result of the coagulant diluting the polyacrylonitrile solvent during the spinning process, is concentrated, reforming the solvent solution and the cycle repeated many times. Various impurities accumulate in the salt solution during such a process and amongst the most troublesome is ionic sulphate soluble in the dilute thiocyanate but prone to precipitate as sodium sulphate from the concentrated thiocyanate solution. The precipitation is, however, not a clean one which can be isolated in a particular unit process of the recycle, rather it occurs haphazardly at all parts of the process where the concentrated thiocyanate solution is employed and the deposits may then be troublesome, forming a tenacious deposit in pipes, or blocking the spinnerette holes.

It has previously been proposed to precipitate the ionic sulphate as barium sulphate by the addition of a soluble barium salt and to remove the precipitate from the thiocyanate solution by filtration, centrifuging or decanting. This proposal introduces an extra unit process into the recycle. We have found a cheaper method of utilising the precipitation of barium sulphate.

According to the present invention a process for spinning polyacrylonitrile filaments comprises dosing a solution of polyacrylonitrile in sodium thiocyanate solution with a solution containing barium thiocyanate in an amount less than the stoichiometric equivalent of the ionic sulphate content of the polyacrylonitrile solution, thereby precipitating barium sulphate crystals, and extruding the dosed solution into an aqueous coagulant, forming filaments containing the barium sulphate crystals.

When barium sulphate is precipitated in dilute or concentrated sodium thiocyanate solution the precipitated barium sulphate crystals grow relatively rapidly, say in about ten minutes, to a size at which they would block a spinnerette hole. The minimum time required to prepare a polymer solution from such a solution of sodium thiocyanate is sufficient for this crystal growth to take place, especially if elevated temperatures are employed. It is therefore necessary, by this method, to remove the crystals by one of the separation techniques already mentioned with reference to the prior art, before the sodium thiocyanate solution can be used as a solvent for the polymer.

We have found that when barium sulphate is precipitated in the polymer solution, the freshly formed crystals are of such small size that they easily pass through the holes of the spinerette, and that the presence of the polymer inhibits their growth to such an extent that even on prolonged storage they do not reach a size at which they block the holes.

It is essential that the thiocyanate solution should not contain ionic barium, otherwise the formation of insoluble barium sulphate at unwanted places in the recycle is likely. The concentrated thiocyanate solution is able to tolerate a small amout of ionic sulphate, say about 0.1 percent by weight of $SO_4^{--}$, without precipitating sodium sulphate and the dosage of $Ba(SCN)_2$ should then be calculated to reduce the sulphate ion content of the thiocyanate solution to below this figure, preferably to about 0.05 percent by weight.

The following example in which percentages are by weight, illustrates the present invention.

EXAMPLE

A solution to be used for spinning consisted of polyacrylonitrile dissolved in recycled sodium thiocyanate solution. It had a sulphate content of 0.06% (calculated as $Na_2SO_4$). Barium thiocyanate solution was mixed with the spinning solution in the proportion of 0.036% of $Ba(SCN)_2$, so that the dissolved sulphate was reduced to 0.04% (calculated as $Na_2SO_4$). The remainder of the sulphate was converted to $BaSO_4$, the particle diameter of which was below 0.5 micron, as measured by electron micrography. The solution containing this barium sulphate in suspension was spun in the usual way, and the particles were not detrimental to the process or to the properties of the fibre produced.

What is claimed is:
1. A process for spinning polyacrylonitrile filaments which comprises dosing a solution of polyacrylonitrile in sodium thiocyanate solution with a solution containing barium thiocyanate in an amount less than the stoichiometric equivalent of the ionic sulphate content of the polyacrylonitrile solution, thereby precipitating barium sulphate crystals, and extruding the dosed solution into an aqueous coagulant, forming filaments containing the barium sulphate crystals.

2. A process according to claim 1 wherein the sodium thiocyanate solution contains about 0.1 percent by weight of sulphate ion and the volume and concentration of the solution containing barium thiocyanate are selected so that, after the dosing, the sulphate ion content of the thiocyanate solution is reduced to below about 0.1 percent by weight.

3. A process according to claim 2, wherein the sulphate ion content of the thiocyanate solution is reduced to about 0.05 percent by weight.

References Cited

UNITED STATES PATENTS

| | | | |
|---|---|---|---|
| 2,658,646 | 8/1953 | Stanton et al. | 260—29.6 AB |
| 3,194,862 | 7/1965 | Coover et al. | 264—182 |

JAY H. WOO, Primary Examiner

U.S. Cl. X.R.

260—29.6 An, 29.6 AB, 29.6 Z; 264—179, 182